March 26, 1974  J. P. R. CHERON  3,799,752
APPARATUS FOR TEMPERING SHEETS OF GLASS, IN
PARTICULAR, SHEETS OF CURVED FOAM
Filed June 27, 1972  5 Sheets-Sheet 1

March 26, 1974  J. P. R. CHERON  3,799,752
APPARATUS FOR TEMPERING SHEETS OF GLASS, IN
PARTICULAR, SHEETS OF CURVED FOAM
Filed June 27, 1972  5 Sheets-Sheet 3

March 26, 1974  J. P. R. CHERON  3,799,752
APPARATUS FOR TEMPERING SHEETS OF GLASS, IN
PARTICULAR, SHEETS OF CURVED FOAM
Filed June 27, 1972  5 Sheets-Sheet 5

United States Patent Office 3,799,752
Patented Mar. 26, 1974

3,799,752
APPARATUS FOR TEMPERING SHEETS OF GLASS, IN PARTICULAR, SHEETS OF CURVED FORM
Jean Paul Robert Cheron, Ribecourt, France, assignor to Saint-Gobain, Neuilly-sur-Seine, France
Filed June 27, 1972, Ser. No. 266,687
Claims priority, application France, July 2, 1971, 24,220
Int. Cl. C03b 27/00
U.S. Cl. 65—351                    15 Claims

ABSTRACT OF THE DISCLOSURE

Method and apparatus for tempering sheet glass by jets of coolant directed against the surfaces thereof. In particular the invention is concerned with the tempering of a sheet of glass moving continuously or intermittently in the direction of its length, and shaped to a selected radius of curvature in planes normal to that direction, by passing on a series of shaping rollers, having curved or arcuate central portions. After that shaping the ribbon passes directly to and between upper and lower series of curved rollers associated with nozzles from which cooling fluid is blown to impinge upon the two surfaces of the ribbon. Each two consecutive rollers, both upper and lower, has arranged between them a set of transversely extending nozzle elements which are articulated together and so adjustable that the relation of each element to the contiguous section of its rollers, remains essentially constant for all pivotal or rotational adjustments of the curved rollers.

DESCRIPTION OF THE PRIOR ART

In Pat. No. 3,545,951 there is disclosed apparatus for shaping sheet material in plastic condition, especially heated sheet glass. The apparatus consists of a series of curved rollers each adjustable about its own axis defined by aligned straight ends thereof which are horizontal parallel and uniformly spaced in a horizontal base plane. The rollers are interconnected for adjustment equally as a unit, each about its own axis, to vary the angle which the curved central portions of the rollers make with the base plane. Thus a sheet or ribbon of glass heated to plasticity, and passing on and along the curved central portions of the rollers can be given a curved shape of radius varying from infinity when the curved central portions lie in the base place, to a minimum when those portions are a certain maximum angle to the base plane. Any curvature of the sheet or ribbon between those two extremes may be effected by a corresponding pivotal adjustment of all rollers as a unit, each about its own axis.

In the apparatus of the above-identified patent, after shaping of the glass ribbon moving in its own plane, it is immediately tempered. In accordance with numerous advantageous features of the invention there disclosed, the tempering is effected by jets of cooling fluid directed onto the curved sheet, by rollers which are tubular and perforated at locations along their lengths. Those tempering rollers have the same curvature of their central portions, as the shaping or transport rollers, and are in two sets or series, one above the sheet and the other below. The tempering rollers are so constructed that each directs its jet or jets of coolant perfectly vertically, the jets from the upper rollers being directed downwardly and those of the lower rollers, upwardly.

The tempering apparatus of the aforesaid patent is suitable for sheets of glass of thicknesses greater than about 4 mm., but it is difficult to effect a satisfactory temper therewith, to glass having a thickness less than about 4 mm.

SUMMARY OF THE INVENTION

The chief object of the present invention is to provide tempering apparatus of the type shown by the above-identified patent, wherein the tempering means comprises nozzles of rectilinear form directing cooling fluid onto or against the sheet to be tempered. When nozzles so constructed and arranged are used in the tempering of a flat glass sheet, it is possible to reduce to a very small value the spacing of the nozzles from the surface of the sheet, thus attaining tempering which is at one and the same time powerful and uniform.

Moreover when the sheet is shaped, such as being curved in a transverse plane, there is a tolerance which is possible, within certain limits, between the various points along the nozzle and the surfacse of the glass, without adverse effect upon the improved tempering and the homogeneity of the pieces or particles of the glass in event of shattering.

Nevertheless there are limitations upon the aforesaid variations in spacing between the tempering nozzles and the surface of the glass sheet. Thus, when the sheet is transversely curved as in the aforesaid patent, adequate and satisfactory tempering is not possible when a single and unitary rectilinear nozzles is used. While it is possible to use a nozzle to generally conform to the curvature of the sheet, or a nozzle of polygonal shape, such a construction severely restricts the utility because it is then necessary to use and substitute a set of nozzles for each radius of curvature for which the apparatus can be adjusted. Since there unavoidably a large number of such nozzles required in each apparatus, their removal and replacement by a different set each time the apparatus is adjusted for a new radius of curvature, is costly and time consuming. Such a construction is impracticable because it further requires that each individual apparatus or machine be provided with a large number of replaceable or substitutional sets of nozzles, each set being formed for use with the apparatus only when it is adjusted to produce glass having a corresponding radius of curvature.

Thus it is a very important purpose of the present invention, to provide rectilinearly-shaped blowing nozzles capable of being interposed in a highly advantageous manner, between sequential curved rollers of both upper and lower sets, and effective to satisfactorily temper sheets which are relatively thin, especially less than 4 mm., and at the same time readily adjustable for all radii of curvature throughout the range which the apparatus is capable of producing, from planar to minimum radius and using the same set of nozzles. Thus there is avoided the need to supply a large number of sets of nozzles and the time and labor involved in the substitution of one set for another every time the apparatus is adjusted to produce sheets of a different radius of curvature.

In amplification of the foregoing objects, the invention consists more particularly in a construction whereby each transverse assembly of nozzles, both upper and lower, is composed of a sequence of individual elementary blowing nozzles interconnected in a chain-like fashion, the lateral or end ones of such nozzle elements being articulated to the frame of the apparatus. Thus nozzle parts or elements aforesaid are also articulated together by joints of the ball-and-socket type for instance, which enable angular relative adjustment of the elements about two mutually normal axes so that the planes in which each assembly of elements directs its jets, remains essentially vertical. The central or intermediate element of each set or chain, remains essentially parallel to the intermediate or central portion of the curved roller with which it is associated. Advantageously the rollers are adjusted as aforesaid, by a rotation about the respective axis defined by the aligned straight ends of each.

Because the aforesaid articulations enable angular adjustment of each nozzle assembly in two mutually normal planes, it is possible to maintain constant for all practical purposes, the distance between each element for each set or chain, and the surface of the glass contiguous thereto, throughout the range of angular adjustment of the curved or arcuate portions of the rollers, that is, throughout the range of radii of curvature of the sheets of glass for which the apparatus is designed.

In actual practice where the sheets are of moderate width as in the production of panes for automobile windows, it is sufficient to use three nozzle elements in each set or chain, namely, a central element and two lateral elements, one on each side thereof.

Thus there has been selected for disclosure purposes a non-limiting form of apparatus as previously described, wherein each set of nozzle elements is composed of three linear elements, namely a central part or element and two lateral side elements. At each of its end walls or extremities the central element has a pivotal joint connection with the adjacent end wall of a respective one of the side element nozzles. Likewise the other or outer end of each side element is attached by a universal joint type of coupling, with a spindle fixed on the frame or chassis of the apparatus.

Due to the aforesaid coupling between the side nozzle elements and the frame of the apparatus and the inter-pivotal connections between the side nozzle elements and the central element which can move in longitudinal translation, the jet-forming openings in each set of three elements form a broken line which can be adjusted to conform with the surface defined by the curved rollers jointly when the latter are pivoted, and in accordance with or proportion to such adjustment.

The correct selection of the articulated position of the blowing or tempering nozzles, the length of each of the three linear nozzles of each set, and the location of the central nozzle element of each set, results in the perfect interpositioning of each set between two consecutive curved rollers, for every rotational position of adjustment of those rollers.

The following detailed description in connection with the accompanying drawing, discloses apparatus for the tempering of sheet glass shaped on and by curved rollers as in the above-identified patent. In the embodiment disclosed by way of example, each set of nozzle elements consists of a central one and two lateral ones, articulated together in chain-like relation.

DESCRIPTION OF THE PREFERRED EMBODIMENT

Referring to FIGS. 1 to 6, the positions of one upper and one lower roller are shown for three rotational positions and with the corresponding positions of the blowing nozzles shown schematically. On FIG. 1 the sheet or ribbon of glass is shown at 1, in transverse section, pressed between upper roller 2 and lower roller 3. The blowing nozzles associated with the lower roller are indicated at 4 while those associated with the upper roller are shown at 5. In this figure the curved or arcuate central portions of the rollers have been rotated or adjusted into the base plane, that is, the plane determined respectively by the straight aligned parallel end portions of all the upper rollers and all of the lower rollers. Hence the sheet or ribbon passes between the two sets, without having any curvature imparted thereto. At 6 is indicated the articulation between the left and central nozzle elements associated with the upper roller 2 and at 7 is identified the articulation between the central upper nozzle element and its right hand associate. Similarly 8 and 9 identify the articulations between the central nozzle for lower roller 3 and its left and right associates, respectively.

Figure 1:
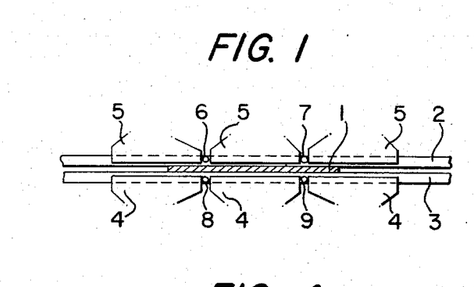
FIG. 1 shows schematically, in elevation, a pair consisting of upper and lower curved tempering rollers adjusted so that their arcuate central portions lie in the common base plane, in which position the sheet or ribbon passing between them has no curvature.
Figure 4:
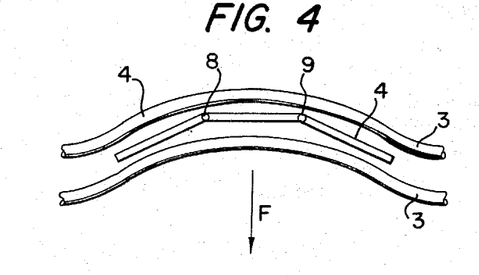
FIGS. 4, 5 and 6 show in plan the adjustment of two consecutive lower rollers corresponding to FIGS. 1, 2 and 3, respectively.
Figure 7:
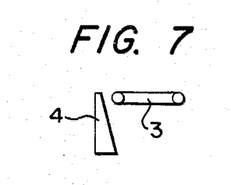

FIG. 4 shows in plan the rotational positions of a contiguous pair of lower rollers for the same angular adjustment as in FIG. 1, that is, the base planes of those rollers coincides with the plan of FIG. 4. The reason for a showing of no curvature in FIG. 1, is apparent from inspection of FIG. 4. FIG. 7 is an end view of the same or null zero-angle adjustment of FIGS. 1 and 4, with an associated blowing nozzle 4.

Figure 2:
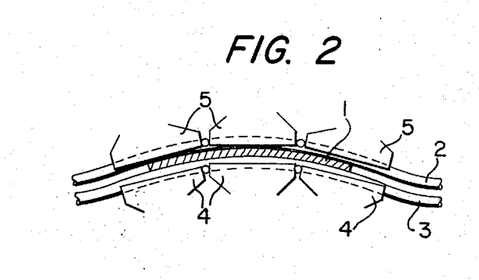
FIG. 2 is a view corresponding to FIG. 1 wherein the rollers have been pivoted so that their central curved portions conform to a certain transverse radius of curvature previously given to the sheet.
Figure 5:
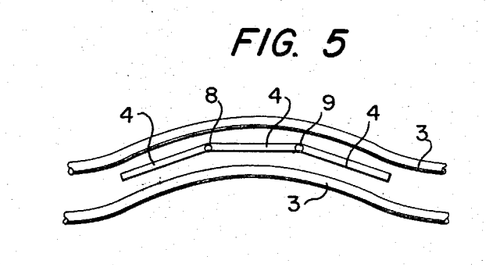
Figure 8:
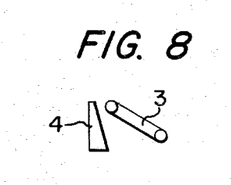

In FIG. 2, rollers 2 and 3 have been turned about their respective axes, out of the base plane. FIG. 5 shows two consecutive lower rollers 3 turned to the same intermediate adjustment as in FIG. 2. FIG. 8 is a corresponding end view of lower rollers 3 from which it is noted that the curved portion of the roller lies in a plane elevated about 30° with respect to the base plane. From FIG. 2 it is noted that the end or lateral nozzles 4 and 5 have been tilted correspondingly so that they are essentially in tangential relation with curved sheet 1.

Figure 3:
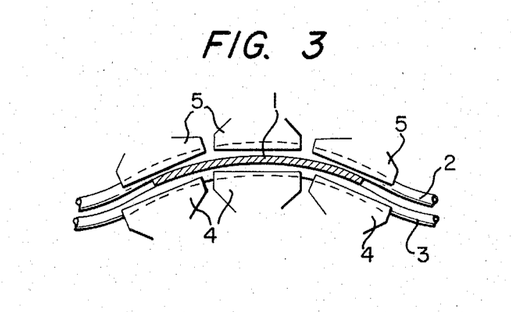
FIG. 3 is a view corresponding to FIGS. 1 and 2, showing an adjustment of the rollers conforming to a sheet having a curvature of minimum possible radius.
Figures 6, 9:
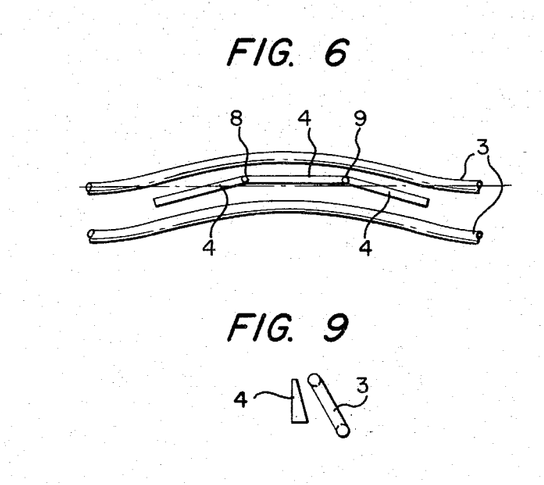
FIGS. 7, 8 and 9 illustrate schematically the angular positions relatively to the base plane, of one of the lower rollers as seen from one end thereof, for each of the corresponding positions of FIGS. 1, 2 and 3, respectively.

FIGS. 3, 6 and 9 show a further working positional adjustment of cooperating upper and lower rollers wherein, as viewed upon FIG. 3, the plane of the arcuate or curved central portions of the rollers have been turned to an angle of about 60° with respect to the base plane. In this position, as is clear from a comparison of FIGS. 2 and 3, a still greater curvature that is, a curvature of smaller radius, is being imparted to the sheet. The direction of translation of the sheet is in all cases as indicated by the arrow, FIG. 4.

Figure 10:
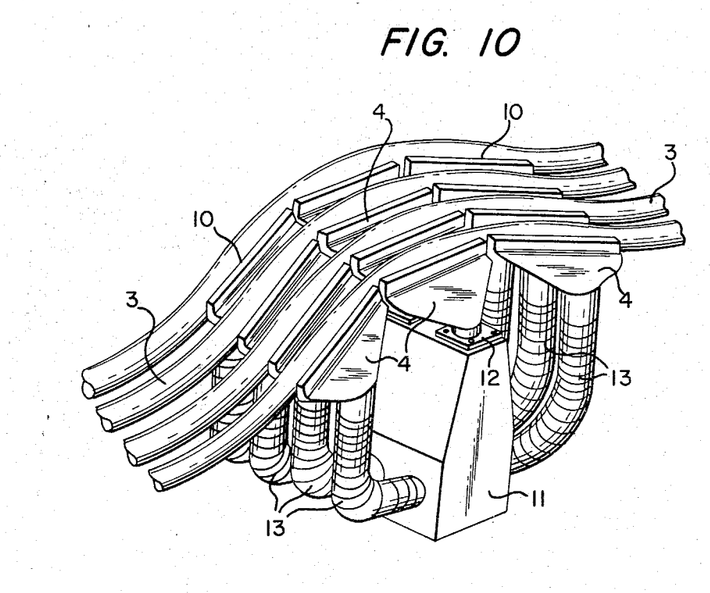
FIG. 10 is a perspective view showing a number of the lower tempering rollers and the blowing nozzles associated with each.

FIG. 10 shows in perspective four of the lower rollers 3 together with their associated blowing or tempering nozzles, there being a set of three such nozzle elements 4, right center and left, interposed between each sequential pair of rollers, i.e. between each roller and the sequentially adjacent roller. Each element 4 terminates at its upper end in a blowing opening or slot 10, in position to direct a blast of coolant onto the superposed sheet or ribbon which may be moving in the direction indicated by the arrow F, FIG. 4. The nozzles are supplied with coolant such as air, from a fixed casing or plenum 11 to which the central nozzle is rigidly attached by coupling 12. The lateral or end nozzles are supplied from the plenum, through flexible tubes 13 which enable their angular adjustment with respect to the center nozzle, by reason of articulated connection therewith in accordance with the invention.

Figure 11:
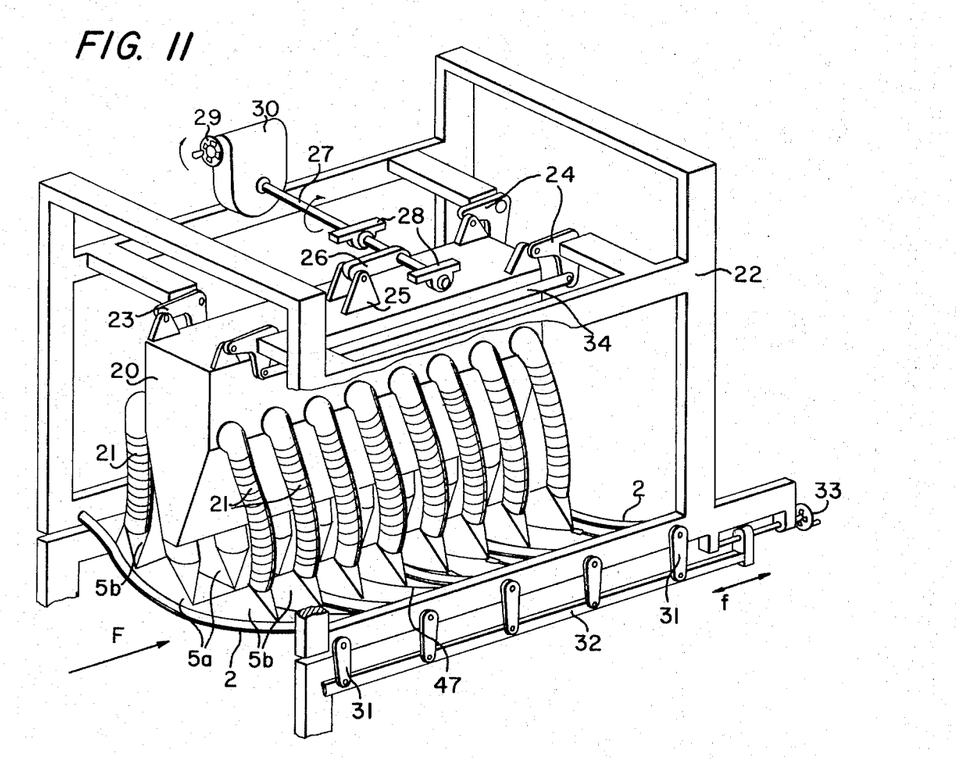
FIG. 11 is a perspective view showing the upper tempering rollers, their blowing nozzles and the controls therefor.

FIG. 11 shows in perspective an assembly of tempering nozzles for upper rollers 2, with central nozzle element 5a and lateral nozzles 5b. The central nozzles are fixed directly to and in depending relation from the plenum or box 20. The lateral or end nozzles are connected to the same plenum, through flexible tubes 21. The number of lower rollers may be twice that of the upper ones, with one upper roller over each alternate lower roller. This makes it possible to have a double row of nozzles between each consecutive pair of upper rollers, it beng noted that it is necessary to have the same number of nozzles effective upon each surface of the sheet. See FIGS. 10 and 11.

The upper plenum or box 20 is mounted on the frame 22 of the apparatus by means of bellcranks 23 and 24, pivoted to the frame at their centers and having their one ends pivoted to the ears fixed with the top wall of the plenum. The other ends of the cranks are interconnected in a manner clear from FIG. 11, by side links one of which is shown at 34. The plenum is suspended from the central portion of its top wall, by spaced lugs 25 fixed thereto and pivoting between them one end of a lever 26 fixed at its other end to a shaft 27. This shaft is journaled in spaced bearing 28 fixed to a part of the frame, not shown. At one end shaft 27 has a toothed pinion fixed thereto, in mesh with a worm fixed on a common shaft with handwheel 29. The pinion and the worm are mounted in casing 30 and operate in a way which will be understood, so that when the handwheel is turned, shaft 27 is thereby rotated at a reduced rate to thus adjust the plenum in the vertical direction with respect to the frame of the apparatus. The parallelogram system embodied in bellcranks 23, links 34, etc. assures that the plenum is limited to vertical translation only, plus a component of horizontal longitudinal translation.

By the construction just described, when the upper rollers are simultaneously pivoted each about its own axis, to vary the radius of curvature of the surface conjointly defined by the central arcuate portions, plenum 20 may be corresponding adjusted to maintain constant the position of the center nozzle element of each set in the vertical direction, with respect to the central portion of the arc of each roller with which it is associated. As will be noted, the plenum and central nozzle elements are also given a component of adjustment in the horizontal direction corresponding to the direction of travel of the sheet, as indicated by the arrow F. In this regard it will be recalled that each central nozzle element of the sets is fixed to the plenum in depending relation therefrom.

Also shown upon FIG. 11 are the means of unitarily controlling the rotational adjustment of the curved rollers 2. As shown, one straight end of each roller has a lever 31 fixed radially thereon. The levers are maintained in parallel relation by a link or rod 32 pivoted at points spaced therealong, to the other ends of the levers. As shown, one end of the link may be moved generally horizontally by a threaded rod parallel therewith and turnable by means of handwheel 33 and engaging a nut fixed with the contiguous end of the link. Thus turning of handwheel 33 in one direction or the other simultaneously and equally pivots all of the rollers in a corresponding direction, each about its own horizontal axis. All axes are spaced and parallel in a horizontal base plane. It will be obvious that the operation of handwheel 33 to vary the inclination of the curved roller portions by means of link 32 can be effected simultaneously with the adjustment of box 20 by control device 29, 30. In fact it is contemplated that the two devices may be interconnected for adjustment by one and the same mechanism.

Figure 12:
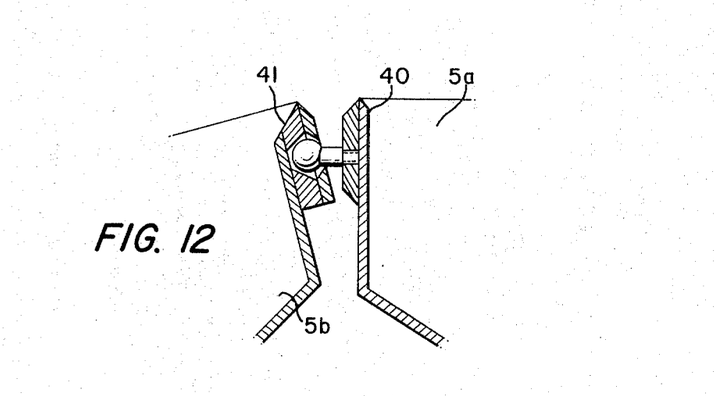
FIG. 12 is a detail view to an enlarged scale, showing a universal connection between one of the center blowing nozzles and one side nozzle.

FIG. 12 shows a detail of the articulation 6 of a central nozzle element 5a to one lateral or side element. Protrusions are fixed to the adjacent end walls. One has a ball rigid therewith, received in a socket in the other. The contiguous edges are beveled or chamfered as indicated at 40 and 41, in order to assure uniformity of the rectilinear jets all the way across the sheet. Otherwise the tempering of the sheet at locations directly over the ball-and-socket couplings might not be uniform with that at locations directly over or opposite the slots of nozzles 5a, 5b, etc., and might result in heterogeneous fragmentation in event of shattering.

The features described above in regard to the upper nozzles 5 are equally useful for the lower ones 4. The latter may be supported and adjusted in the same general way as has been described for plenum 20, FIG. 11.

Figure 13:
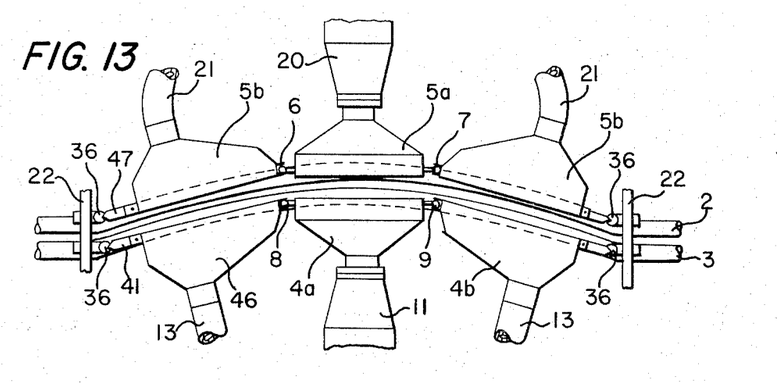
FIG. 13 is a view in transverse elevation showing the articulation of the blowing nozzle elements to their supporting chassis.

FIG. 13 illustrates in elevation the assembly consisting of an upper and lower pair of rollers each provided with a nozzle unit of three elements. Upper roller 2 has central nozzle 5a and side nozzles 5b, right and left, while lower roller 3 is associated with central nozzle 4a and side nozzles 4b, right and left. As previously described in connection with FIG. 11, the central nozzle elements are supplied with coolant directly from plenum 20 while the side elements are supplied through flexible tubes 21 also in communication with the plenum. As described in connection with FIG. 10, each central element 4a is supplied with coolant, directly from plenum 11 while each side element is supplied therefrom through flexible tubes 13. The interconnection between central element 5a and left element 5b of one upper roller 2, is identified at 6. An identical ball-and-socket connection is indicated at 7, between central element 5a and right element 5b of the same roller. Numerals 8 and 9 indicate like articulations between the central element 4a of lower roller 3 and its side elements 4b, left and right.

Still referring to FIG. 13, parts of the chassis supporting the nozzle sets are indicated at 22, right and left. At the left is shown a connection of the universal joint type by which the elements of each of the nozzle sets, upper and lower, are maintained in their own vertical planes transversely across the sheet, and at the same time permitted to adjust to the vertical adjustments of central nozzle elements 4a, 5a, as those elements move vertically with their respective plenums 11 and 20 as the result, for example, of mechanism 29, 30, FIG. 11, for plenum 20, as previously described. It is recalled that these adjustments are for the purpose of adjusting the nozzle sets in vertical transverse planes when the rollers are pivoted to correspond to a change in radius of curvature of the sheet produced. Since these articulations may all be alike, a description of one of them will suffice.

Figures 14, 15:
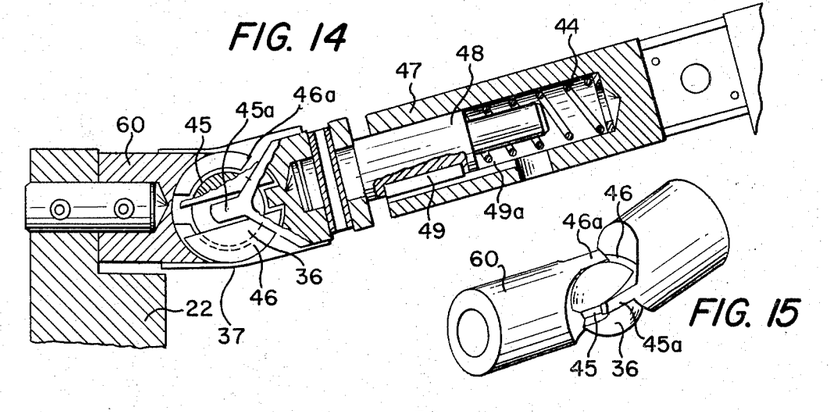
FIG. 14 is a detail sectional view to a scale enlarged over FIG. 13, of the articulation between a side nozzle element and its supporting chassis.
FIG. 15 is a perspective view to a still greater scale, of the articulation feature of FIG. 14.

Referring to FIGS. 14 and 15, the articulation there shown comprises a generally spherical element 36 having a flexible shield or cover 37 and provided with grooves 45 and 46 disposed respectively in two mutually normal equatorial planes through its center. Spaced parallel fingers 45a are fixed with one end of a shaft 48 and engage with a smooth sliding fit in channel 45. Shaft 48 has a splined connection 49, 49a, inside the bore of a second shaft 47. See FIG. 14. Shaft 47 may be fixed directly to a corresponding nozzle element such as 4b or 5b. A spindle 60 is, as shown, fixed against rotation with respect to chassis part 22, and has spaced parallel fingers 46a slidably fitting groove 46.

By the foregoing connection shaft 48 may have free angular movement in the vertical plane through its longitudinal axis, relatively to spindle 60, but is constrained against rotation about that axis. Since shafts 47 and 48 have splined interconnection, shaft 47 imparts to the side nozzle element such as 4b to which it is attached, a like angular movement in a fixed vertical transverse plane, as its central nozzle element is adjusted vertically. It will be understood that each side nozzle of all sets, upper and lower, are connected with the chassis by a like universal coupling.

By the construction just described, because spindle 60 is fixed against rotation, the side or lateral nozzle elements which are supplied with coolant through flexible tubes, cannot turn about the axis of shaft 48. Thus the side elements are adjusted for instance, from the angular positions shown upon FIG. 2, to those of FIG. 3, by and in response to a vertical adjustment of the corresponding one of the central elements.

Figure 16:
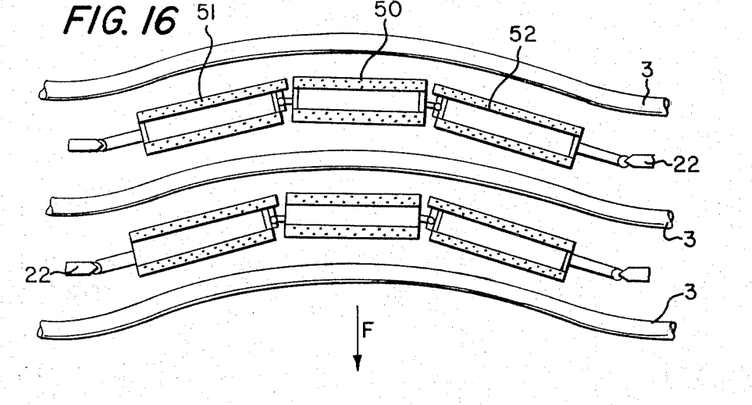
FIG. 16 is a plan view of six blowing and tempering nozzles arranged in accordance with a modification, in triads, each between two consecutive curved rollers supporting the sheet or ribbon of glass.

Turning to FIG. 16 presenting in a plan a series of three curved lower rollers 3, each consecutive pair of rollers is spaced to receive between them, a set of three blowing elements, namely, a central element 50 and side elements 51, 52, left and right. The elements are articulated together as in FIG. 12, and connected to the frame members 22 of the apparatus by means as in FIGS. 14 and 15.

Figure 17:
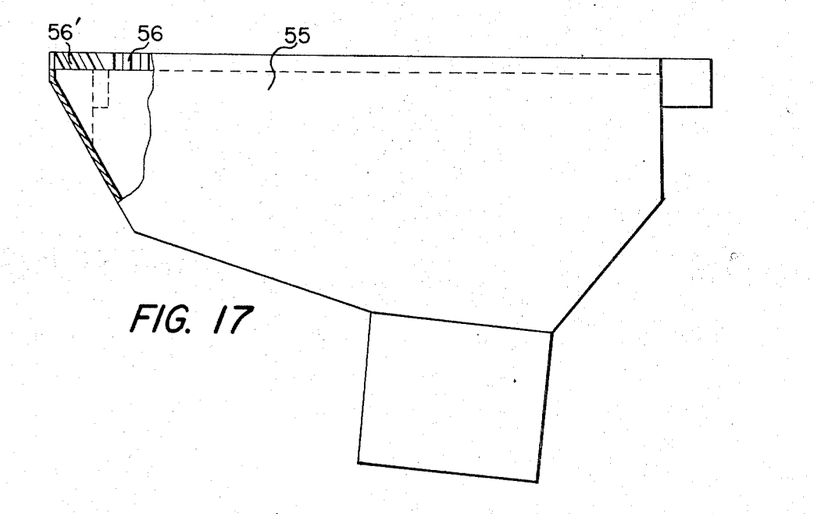
FIG. 17 is a transverse view partly in section, of a blowing nozzle of the construction and arrangement of FIG. 16.
Figure 18:
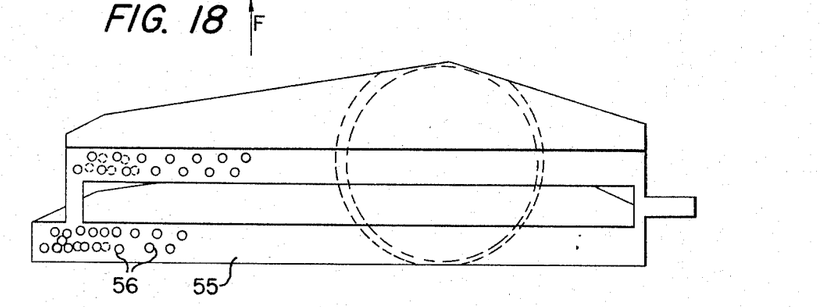
FIG. 18 is a plan view corresponding to FIG. 17.

FIGS. 17 and 18 show in detail and to an enlarged scale, one of the blowing or nozzle elements of FIG. 16. FIG. 17 is a side elevation partly in section and FIG. 18 is a plan view looking up, of a double nozzle of the type involved. These nozzles are formed of a hollow casing having a top wall (in the case of lower rollers 3) in the form of a plate 55 pierced by a large number of straight orifices 56 arranged in an orderly pattern. The orifices have the advantage of a better distribution of cooling air directed against the surfaces of the glass, thereby increasing the efficiency and effectiveness of cooling.

As shown by the portion of one element in section, FIG. 17, a number of the orifices 56' at the inboard end of the top wall, are directed obliquely inwardly toward the next adjacent element. As in the case of chamfered edges 40, 41, FIG. 12, the construction described for FIG. 17 assures a better continuity or uniformity of cooling in the region of the sheet over the space between two nozzle elements. Arrow F, FIGS. 18 and 19 indicates the direction of translation of the sheet or ribbon of glass being cooled and tempered.

Figure 19:
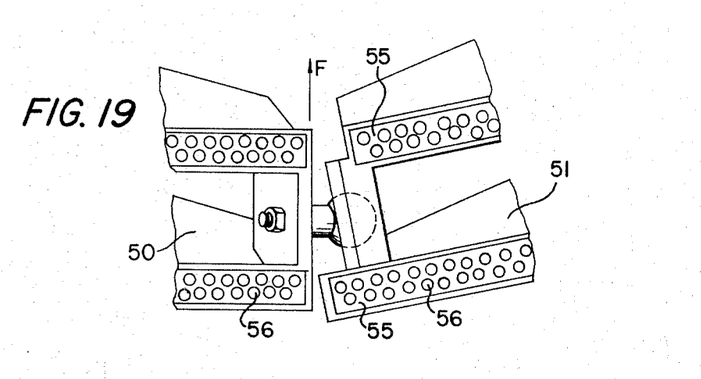
FIG. 19 is a detail view of the articulated connection between one of the central nozzles and one of its side or lateral nozzles.

FIG. 19 shows in detail the ball-and-socket articulation between the contiguous end walls of center nozzle element 50 and one lateral element 51, as in FIG. 16. This connection is essentially the same as shown at FIG. 12, previously described.

Noting and comparing FIGS. 16, 18 and 19, the perforated plates of each of the lateral or side nozzles, are of different lengths. By this construction as is clear from the arrow F, FIG. 19, showing the direction of movement of the sheet being tempered, there is avoided any otherwise possible discontinuity of flow of cooling air flow against the sheet, in particular where the elements are disposed at substantial angles relatively to one another as in FIG. 4, 16 or 19. In using such a construction, as will be noted, the upstream part of each nozzle element is extended and thus of greater linear extent than the corresponding downstream part. The center element may, as shown, have its upstream and downstream perforated walls, of equal length.

The double nozzle elements having pierced walls or plates as above described, may be replaced by elements having upstream and downstream slots for egress of coolant. However, I prefer the perforated plate construction because the pressure at which the coolant is supplied can vary more widely than in the case of nozzles consisting of two essentially parallel straight slots or slits, without deleteriously affecting the quality of tempering. In fact, by proper selection of the diameter of the multiplicity of apertures and their spacing and distribution it is possible to decrease by 30% the size of the particles into which a tempered sheet of glass will shatter, without altering the effective outlet pressure of the cooling medium. Or if a certain size of fragments is satisfactory, the improved construction of pierced blowing walls as described, makes it possible to operate at materially reduced blowing pressure and consequent saving in cost of operation. Moreover the construction using multiple-aperture nozzles plates, operates more quietly than the linear slot construction.

In order to avoid possible optical defects in the tempered glass, such as "combing" it is preferable however to make the first series of nozzle elements, that is, upstream nozzles, of the double slot type. The remaining series of nozzle elements may then be of the multiple-aperture type aforesaid While apparatus as above described is particularly well adapted for tempering relatively thin sheet glass of the order of about 3 mm., it is also equally effective in tempering sheet glass of greater thickness than 3 mm. The complete tempering apparatus embodies in general, several consecutive aligned series of nozzle assemblies, both upper and lower, as shown by FIGS. 10 and 11. The chassis supporting the blowing nozzles can be made retractable thus enabling ready access for inspection and adjustments. The apparatus is well adapted for use in production line outpuet of curved and tempered sheets of glass.

I claim:

1. Apparatus for tempering a sheet of plastic material, in particular glass shaped into curved form, comprising a plurality of lower curved sheet-supporting rollers, means mounting said rollers for pivoting, each about its own chordal axis, all said axes being parallel in spaced relation in a first base plane, means for simultaneously pivoting all said rollers each about its own axis to conjointly define a surface conforming to a sheet of desired curvature, a plurality of tempering nozzles each extending along and between two consecutive ones of said rollers, said nozzles being disposed below the surface defined by said rollers and operable to direct coolant upwardly against a sheet supported on and by said rollers, each nozzle comprising a central element and at least two side elements, one on each side of said central element, means pivotally connecting each side element to a respective end of its said central element, and adjustment means connected with said elements and operable to effect relative angular adjustment thereof, while maintaining them in second planes normal to said first base plane.

2. Apparatus for tempering a sheet of plastic material, in particular glass shaped into curved form, comprising a plurality of lower curved sheet-supporting rollers, means mounting said rollers for pivoting, each about its own chordal axis, all said axes being parallel in spaced relation in a first base plane, means for simultaneously pivoting all said rollers each about its own axis to conjointly define a surface conforming to a sheet of desired curvature, a first plurality of tempering nozzles each extending along and between two consecutive ones of said rollers, said nozzles conjointly conforming generally to and spaced below the surface defined by said rollers and operable to direct coolant upwardly against a sheet supported on and by said rollers, each nozzle comprising a set of interconnected nozzle elements forming a chain-like assembly, said apparatus further comprising a plurality of curved upper rollers, means mounting said upper rollers each for pivoting about its own chordal axis, the axes of said upper rollers being spaced and parallel in a second base plane parallel to and spaced above said first base plane, means interconnecting all said upper rollers and operable to adjust each about its own axis into conformity with the surface conjointly defined by said lower rollers, a second plurality of tempering nozzles each like the nozzles of said first plurality and each interposed between two consecutive ones of said upper rollers and conforming generally to and spaced above the surface conjointly defined by said upper rollers to direct coolant downwardly onto a sheet supported and positioned between said upper and lower rollers, a plenum located above and extending transversely across said upper rollers, each central nozzle element of said second nozzles being in communication with and depending from said plenum in fixed relation therewith, there being at least two side elements to each nozzle of said second plurality, one on each side of the central element, ball and socket means interconnecting the elements of each nozzle of said second plurality, universal joint means connecting a fixed part of the apparatus to each such side element to limit the same to pivoting in a plane normal to said base plane, flexible tube means in communication with said plenum and each such side element, and means operable to vertically adjust said plenum, thereby to angularly adjust the side nozzle elements and central element of the nozzles of said second plurality into general conformity with the curvature of a sheet supported as aforesaid.

3. Apparatus for tempering a sheet of plastic material, in particular glass shaped into curved form, comprising a plurality of lower curved sheet-supporting rollers, means mounting said rollers for pivoting, each about its own chordal axis, all said axes being parallel in spaced relation in a first base plane, means for simultaneously pivoting all said rollers each about its own axis to conjointly define a surface conforming to a sheet of desired curvature, a first plurality of tempering nozzles each extending along and between two consecutive ones of said rollers, said nozzle conjointly conforming generally to and spaced below the surface defined by said rollers and operable to direct coolant upwardly against a sheet supported on and by said rollers, each nozzle comprising a set of interconnected nozzle elements forming a chain-like assembly, said apparatus further comprising a plurality of curved upper rollers, means mounting said upper rollers each for pivoting about its own chordal axis, the axes of said upper rollers being spaced and parallel in a second base plane parallel to and spaced above said first base plane, means interconnecting all said upper rollers and operable to adjust each about its own axis into conformity with the surface conjointly defined by said lower rollers, a second plurality of tempering nozzles each like the nozzles of said first plurality and each interposed between two consecutive ones of said upper rollers and conforming generally to and spaced above the surface conjointly defined by said upper rollers to direct coolant downwardly onto a sheet supported and positioned between said upper and lower rollers, a plenum disposed centrally of and over said plurality of upper rollers transversely thereof, tubular means fixing the central element of each of said second plurality of nozzles to and in depending relation from said plenum and placing each such central element in communication with said plenum, and a plurality of flexible tubes each communicating at one end with a respective nozzle element at each side of its central element, and at its other end with said plenum.

4. The apparatus of claim 1, the elements of each nozzle conjointly forming a substantially continuous linear jet directed upwardly against and across a sheet supported on said sheet-supporting rollers.

5. The apparatus of claim 1, the elements of each nozzle set conjointly forming a single linear row of discrete spaced jets, extending substantially continuously across and directed against a sheet supported on said sheet-supporting rollers.

6. The apparatus of claim 1, the elements of each nozzle set conjointly forming two linear rows of discrete spaced jets each extending substantially continuously across and directed against a sheet supported on said sheet-supporting rollers.

7. The apparatus of claim 1, said adjustment means comprising, means mounting each said central element for vertical translation between its corresponding pair of curved rollers, and universal joint means mounting the outboard end of each said side element for universal angular movement in said second planes.

8. The apparatus of claim 7, said means mounting each central nozzle element comprising, a plenum having an upper wall from which all said central elements extend in fixed relation therewith, each between its two consecutive rollers, and a plurality of flexible tubes each in communication at one end with a respective one of said side elements and at its other end in communication with said plenum.

9. The apparatus of claim 8, said means mounting each central nozzle element also comprising a parallelogram linkage conected between the plenum and the frame of the apparatus, and guiding the plenum for translation in a plane normal to the axes of said rollers, and means connected with said plenum and manually operable for effecting said longitudinal translation thereof.

10. The apparatus of claim 2, each said universal joint means comprising a ball having first and second grooves in respective mutually-normal equatorial planes thereof, a first shaft having one end forked, with tines fitting diametrically opposite portions of said first groove, a fixed spindle having a forked end with tines fitting diametrically opposite portions of said second groove, and a connection between the other end of said first shaft and the contiguous wall of a side nozzle element.

11. The apparatus of claim 10, said last-named connection comprising a second shaft coaxially of said first shaft and having its one end fixed to the contiguous wall of a side element, and a splined connection between the other end of said second shaft and the contiguous end of said first shaft.

12. Sheet glass tempering apparatus comprising, a frame, a plurality of arcuate sheet-supporting rollers journaled on said frame, each for pivotal movement about its own respective chordal axis, all said axes being in spaced parallel relation in a common base plane, a plurality of nozzle assemblies, each assembly comprising a plurality of linear nozzle elements pivotally interconnected in chain-like relation, and means mounting each said assembly between a respective sequential pair of said rollers and operable to maintain the elements thereof each in a plane normal to said common plane, said means being operable to angularly adjust the elements of each assembly to maintain the same in conformity with the curved surface conjointly defined by said rollers, for all positions of angular adjustment thereof about said chordal axes.

13. The apparatus of claim 12, the elements of each nozzle assembly forming a substantially continuous jet transversely across and directed against a sheet supported on and by said rollers.

14. The apparatus of claim 12, each said nozzle assembly compirsing a central element and first and second side elements, one on each respective side of said central element, the outlet for coolant of each said element comprising a pair of plates spaced in a direction normal to said axes and in a plane angularly related to said base plane, each said plate having therethrough a multiplicity of regularly-arranged jet-forming apertures directing coolant upwardly against a sheet supported on said rollers, and means supplying all said apertures with coolant.

15. The apparatus of claim 14, the plates of said side elements being of greater and lesser lengths in the direction of travel of a sheet over said rollers, the plate of greater length having apertures in registration with the hiatus otherwise formed by the pivotal interconnection of each side element to its central element.

References Cited
UNITED STATES PATENTS

| | | | |
|---|---|---|---|
| 3,545,951 | 12/1970 | Nedelec | 65—104 |
| 3,008,272 | 11/1961 | Black et al. | 65—104 X |
| 3,457,057 | 7/1969 | Gardon | 65—114 |

ARTHUR D. KELLOGG, Primary Examiner

U.S. Cl. X.R.

65—104

PO-1050
(5/69)

UNITED STATES PATENT OFFICE
CERTIFICATE OF CORRECTION

Patent No. __3,799,752__  Dated __March 26, 1974__

Inventor(s) __Jean Paul Robert Cheron__

It is certified that error appears in the above-identified patent and that said Letters Patent are hereby corrected as shown below:

Column 2, line 31, after "nozzle" insert --curved--.
Column 10, lines 2 and 7, after "nozzle" delete "set".

Signed and sealed this 10th day of September 1974.

(SEAL)
Attest:

McCOY M. GIBSON, JR.
Attesting Officer

C. MARSHALL DANN
Commissioner of Patents